(12) United States Patent
Yang et al.

(10) Patent No.: US 9,229,849 B2
(45) Date of Patent: Jan. 5, 2016

(54) DYNAMIC RECONFIGURATION OF STORAGE SYSTEM

(71) Applicant: International Business Machines Corporation, Armonk, NY (US)

(72) Inventors: Shu Yang, Shanghai (CN); Yao Ma, Shanghai (CN); Hui Xiang Gu, Shanghai (CN); Jun Wei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 13/853,646

(22) Filed: Mar. 29, 2013

(65) Prior Publication Data
US 2013/0297905 A1 Nov. 7, 2013

(30) Foreign Application Priority Data

Mar. 29, 2012 (CN) .......................... 2012 1 0088217

(51) Int. Cl.
*G06F 12/00* (2006.01)
*G06F 13/00* (2006.01)
*G06F 12/02* (2006.01)
*G06F 3/06* (2006.01)

(52) U.S. Cl.
CPC .............. *G06F 12/02* (2013.01); *G06F 3/0607* (2013.01); *G06F 3/067* (2013.01); *G06F 3/0631* (2013.01); *G06F 3/0632* (2013.01)

(58) Field of Classification Search
CPC .......... G06F 12/00; G06F 12/02; G06F 13/00
USPC ........................................................ 711/165
See application file for complete search history.

(56) References Cited

U.S. PATENT DOCUMENTS

| 7,921,262 | B1 | 4/2011 | Dash et al. | |
|---|---|---|---|---|
| 7,953,929 | B1 | 5/2011 | Chatterjee et al. | |
| 8,812,653 | B2 * | 8/2014 | Chandrasekaran | 709/224 |
| 2006/0277386 | A1 * | 12/2006 | Eguchi | 711/170 |
| 2007/0239954 | A1 * | 10/2007 | Sakashita et al. | 711/165 |
| 2007/0245116 | A1 * | 10/2007 | Yamamoto et al. | 711/172 |
| 2009/0055593 | A1 * | 2/2009 | Satoyama et al. | 711/134 |
| 2009/0094427 | A1 | 4/2009 | Sano | |
| 2009/0287880 | A1 | 11/2009 | Wright et al. | |
| 2011/0107028 | A1 | 5/2011 | Louis et al. | |

(Continued)

FOREIGN PATENT DOCUMENTS

CN 101808119 8/2010

OTHER PUBLICATIONS

R. Buyya et al., "Intercloud: utility-oriented federation of cloud computing environments for scaling of application services," Procs. of ICA3PP, dated 2010.

(Continued)

*Primary Examiner* — Sanjiv Shah
*Assistant Examiner* — Mohamed Gebril
(74) *Attorney, Agent, or Firm* — Bryan Butler

(57) ABSTRACT

A storage system is dynamically reconfigured. The storage system includes storage pools that each include one or more storage disks. Storage pools to be expanded are determined as target storage pools. For the target storage pools, source storage disks to be moved into the target storage pools are determined from other storage pools than the target storage pools in the storage system. The source storage disks are migrated to the respective target storage pools.

19 Claims, 14 Drawing Sheets

(56) References Cited

U.S. PATENT DOCUMENTS

| | | |
|---|---|---|
| 2011/0167435 A1 | 7/2011 | Fang |
| 2011/0225451 A1 | 9/2011 | Leggette et al. |
| 2011/0238737 A1 | 9/2011 | Agrawal et al. |
| 2011/0282837 A1 | 11/2011 | Gounares et al. |
| 2012/0102291 A1* | 4/2012 | Cherian et al. ............... 711/170 |
| 2012/0297238 A1* | 11/2012 | Watson et al. ............... 714/4.11 |

OTHER PUBLICATIONS

Q. He et al., "Study on cloud storage system based on distributed storage systems," Procs. of 2010 Int'l Conf on Computational and Information Sciences, dated 2010.

H. Lin et al., "LBVS: a load balancing strategy for virtual storage," Procs. of 2010 Int'l Conf. on Service Sciences, dated 2010.

* cited by examiner

US 9,229,849 B2

DYNAMIC RECONFIGURATION OF STORAGE SYSTEM

RELATED APPLICATIONS

The present patent application claims priority under 35 USC 119 to the previously filed Chinese patent application, filed on Mar. 29, 2012, and assigned CN patent application number 201210088217.3.

BACKGROUND

Cloud storage is a cloud computing technology focused on data storage and management. By using cluster applications, grid techniques, or distributed file systems and other functions, cloud storage aggregates a large number of various different kinds of storage devices in a network through application software to operate them in a cooperative manner, and collectively provide data storage and service access functions. Cloud storage enables end users to be provided with more flexible and efficient storage resources.

SUMMARY

A method example method is for dynamically reconfiguring a storage system. The storage system includes storage pools. Each of the storage pools includes one or more storage disks. The method includes determining, among the plurality of storage pools, storage pools to be expanded as target storage pools. The method includes determining, for the target storage pools, source storage disks to be moved into the target storage pools from other storage pools than the target storage pools in the storage system. The method includes migrating the source storage disks to the respective target storage pools.

An example apparatus is for dynamically reconfiguring a storage system. The storage system includes storage pools. Each storage pool includes one or more storage disks. The apparatus includes a target storage pool determining unit, configured to determine, among the plurality of storage pools, storage pools to be expanded as target storage pools. The apparatus includes a source storage disk determining unit, configured to, for the target storage pools determined by the target storage pool determining unit, determine source storage disks to be moved into the target storage pools from other storage pools than the target storage pools. The apparatus includes a source storage disk migrating unit, configured to migrate the source storage disks determined by the source storage disk determining unit to the respective target storage pools.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure. In the detailed description, like numbered elements in the figures are either similar elements or perform an equivalent function. Elements that have been discussed previously will not necessarily be discussed in later figures if the function is equivalent.

As described in the background section, cloud storage is a cloud computing technology. One technique used in cloud storage is transparent allocation/reclamation of dynamic resources (e.g., volumes) to/from a storage pool. Currently, most storage venders can provide storage pools based on storage virtualization products. However, the functions of these current storage products are constrained by storage pool capacity. If the resources of a storage pool are close to full utilization, a volume in the storage pool is unable to be expanded or a thin-provisioned volume drops offline, even though there is enough space in other storage pools belonging to the same storage cloud.

Figure 13:
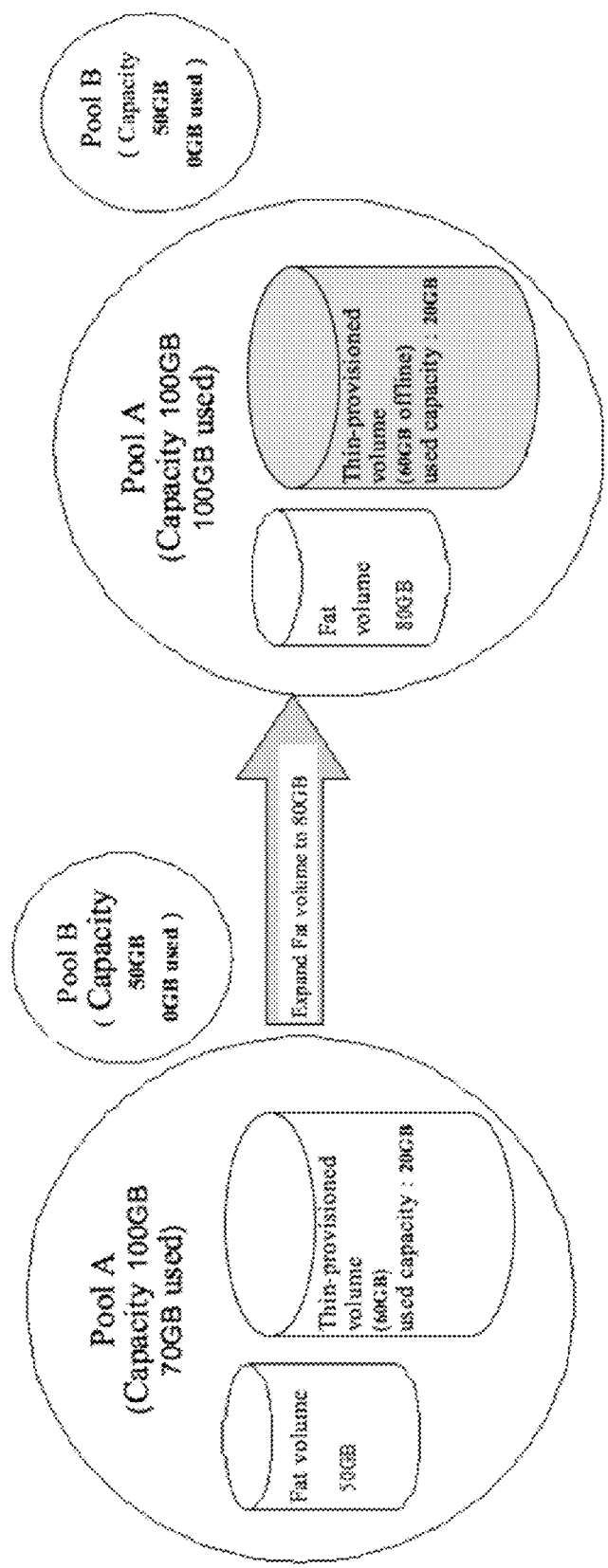
FIG. 13 is a schematic diagram of a conventional example of failed capacity expansion of a storage system.

For instance, as shown in FIG. 13, assume that there are two SVC storage pools in a storage cloud, pool A with a capacity of 100 gigabytes (GB), and pool B with a capacity of 50 GB. Pool A includes two volumes, a 50 GB Fat volume and a 60 GB thin-provisioned volume, wherein a 20 GB storage space has been actually used in the thin-provisioned volume. Pool A is almost fully used (as shown in FIG. 13, 70 GB used), whereas pool B is not used at all. Although a user of the storage cloud may observe at least a 30 GB free space in the whole storage system, when he or she attempts to expand the Fat volume of pool A to above 80 GB, a failure response will be received because the current storage cloud does not support automatic capacity mobility across storage pools. Alternatively, the Fat volume will be expanded to just 80 GB, but the thin-provisioned volume will drop offline due to no more space for accommodating newly added data, while the space of pool B is still untouched.

To address the above shortcomings, conventionally users have to manually remove some volumes from other storage pools and add them into a storage pool required to be expanded, or manually migrate a volume to be expanded into other available storage pool. However, these approaches have poor efficiency and high cost, because users cannot recognize how many and what volumes in which storage pool should be moved, nor which particular storage pool a volume should be moved to. Inaccurate volume movement/migration results in a performance penalty for both target and source storage pools. Disclosed herein, by comparison, are techniques that are capable of monitoring the capacity utilization of a storage system, and automatically and accurately determine a storage resource mobility policy.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

The characteristics include the following. On-demand self-service means a cloud consumer can unilaterally provision computing capabilities, such as server time and network storage, as needed automatically without requiring human interaction with the service's provider. Broad network access means capabilities are available over a network and accessed through standard mechanisms that promote use by heterogeneous thin or thick client platforms (e.g., mobile phones, laptops, and PDAs). Resource pooling means the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity means capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service means cloud systems automatically control and optimize resource use by leveraging a metering capability at some level of abstraction appropriate to the type of service (e.g., storage, processing, bandwidth, and active user accounts). Resource utilization can be monitored, controlled, and reported providing transparency for both the provider and consumer of the utilized service.

The service models include the following. Software as a Service (SaaS) is the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) is the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) is the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models include the following. A private cloud is a cloud infrastructure is operated solely for an organization. It may be managed by the organization or a third party and may exist on-premises or off-premises. A community cloud is a cloud infrastructure is shared by several organizations and supports a specific community that has shared concerns (e.g., mission, security requirements, policy, and compliance considerations). It may be managed by the organizations or a third party and may exist on-premises or off-premises.

A public cloud is cloud infrastructure is made available to the general public or a large industry group and is owned by an organization selling cloud services. A hybrid cloud is a cloud infrastructure that is a composition of two or more clouds (private, community, or public) that remain unique entities but are bound together by standardized or proprietary technology that enables data and application portability (e.g., cloud bursting for load-balancing between clouds). A cloud computing environment is thus service oriented with a focus on statelessness, low coupling, modularity, and semantic interoperability. At the heart of cloud computing is an infrastructure of a network of interconnected nodes.

Figure 1:
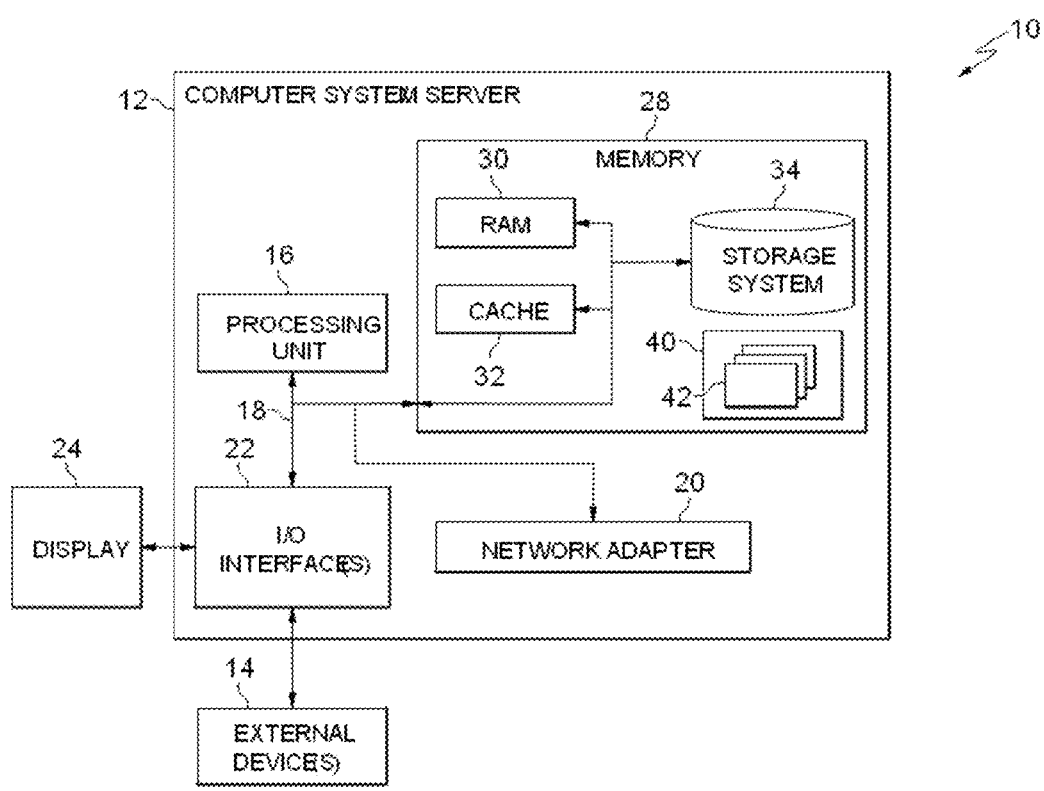
FIG. 1 is a diagram of an example cloud computing node.

Referring now to FIG. 1, a schematic of an example of a cloud computing node is shown. Cloud computing node 10 is only one example of a suitable cloud computing node and is not intended to suggest any limitation as to the scope of use or functionality of embodiments of the techniques described herein. The cloud computing node 10 is capable of being implemented and/or performing any of the functionality described above.

In cloud computing node 10 there is a computer system/server 12, which is operational with numerous other general purpose or special purpose computing system environments or configurations. Examples of computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

In FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media. System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As further depicted and described below, memory 28 may include at least one program product having a set (e.g., at least one) of program modules that are configured to carry out the functions of techniques disclosed herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of techniques described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
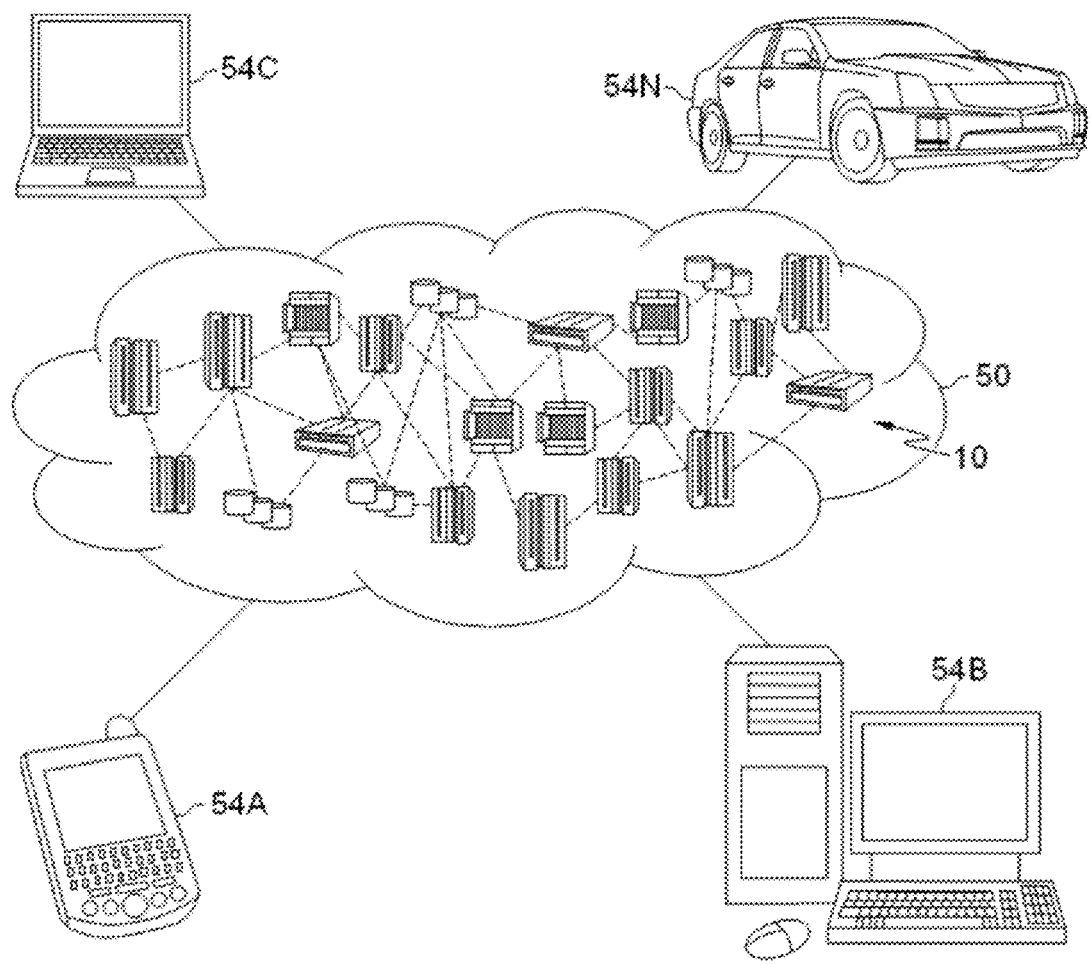
FIG. 2 is a diagram of an example cloud computing environment.

Referring now to FIG. 2, an example illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
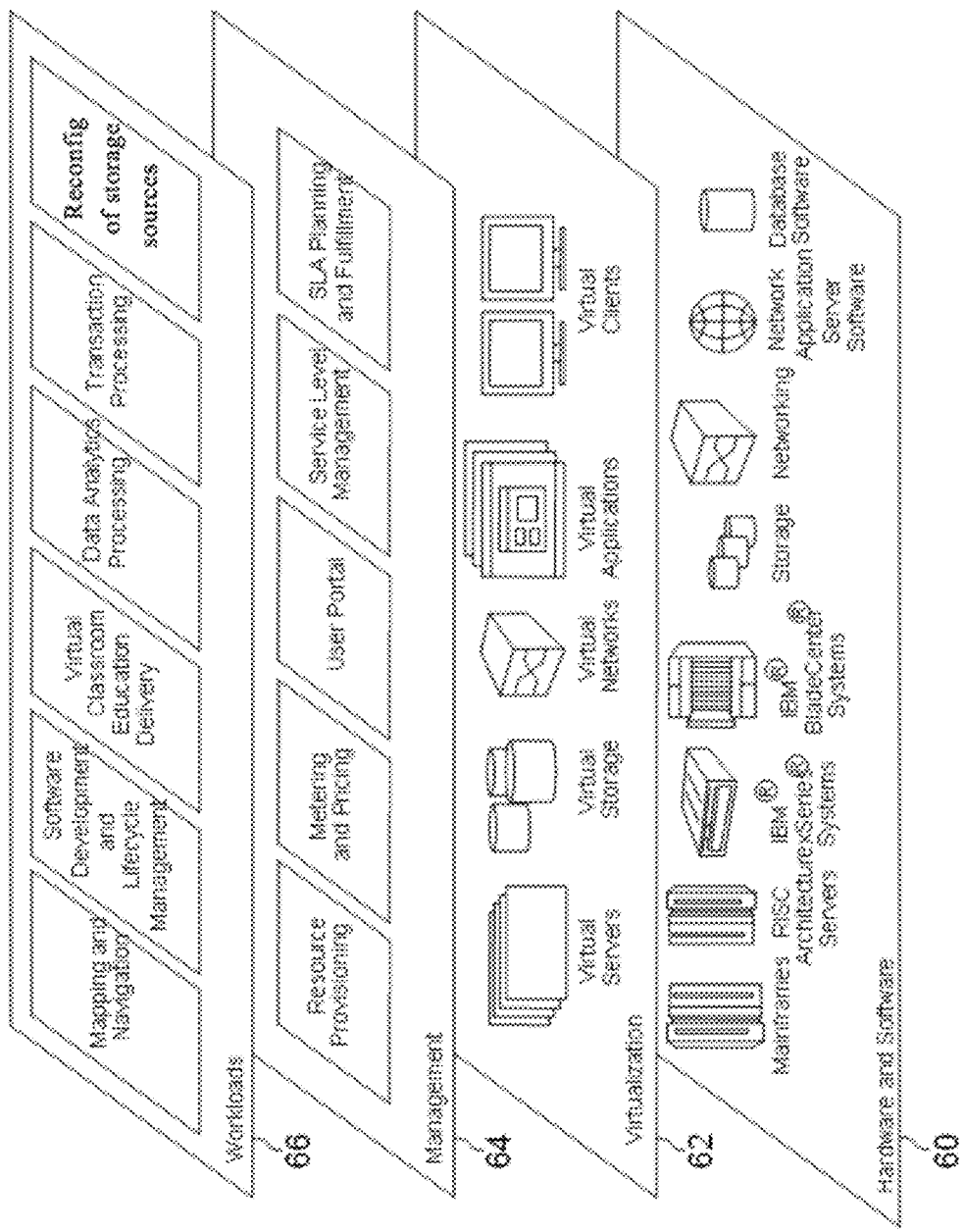
FIG. 3 is a diagram of example abstraction model layers.

Referring now to FIG. 3, an example set of functional abstraction layers provided by cloud computing environment 50 (FIG. 2) is shown. It should be understood in advance that the components, layers, and functions shown in FIG. 3 are intended to be illustrative only and not limiting. As depicted, the following layers and corresponding functions are provided.

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients. In one example, management layer 64 may provide the following functions. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may include or be application software licenses.

Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

As described above, to automatically and accurately reallocate storage resources in a storage system, for example, a storage cloud, method and device monitor capacity utilization of each storage pool in the storage system, and determine target storage pools to be expanded according to the growth trend of their capacity utilization. They develop a storage resource mobility policy for the target storage pools, and execute the mobility policy to move source storage disks from source storage pools to the target storage pools. These functions may be implemented within the workloads layer 66 of FIG. 3.

Figure 4:
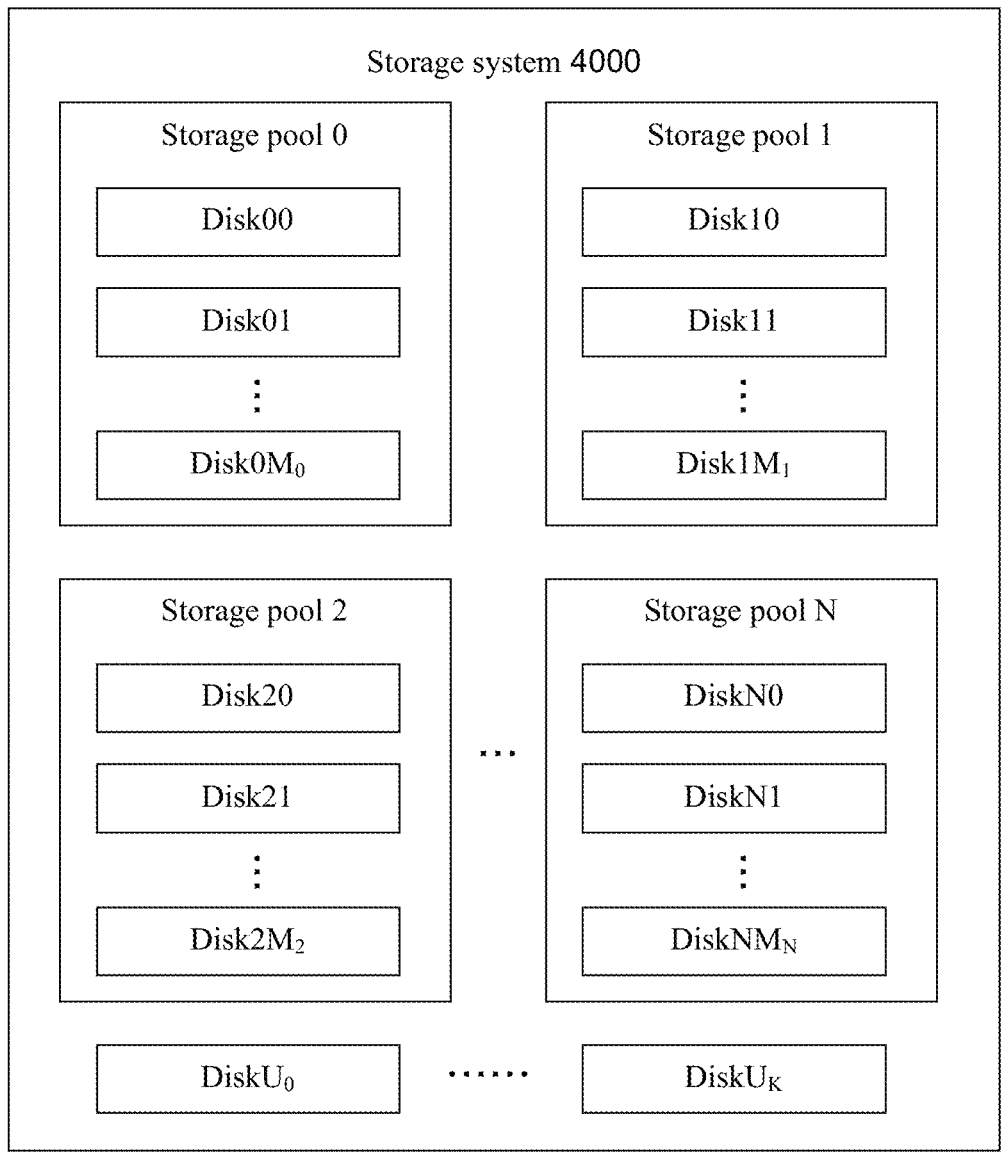
FIG. 4 is a schematic diagram of an example storage system.

Different examples are described in detail with reference to FIGS. 4 through 12. FIG. 4 schematically shows an example storage system 4000. Storage system 4000 is, for example, a cloud storage system. As shown in FIG. 4, storage system 4000 includes multiple storage pools, such as a storage pool 0 to a storage pool N, where N is an integer equal to or larger than 1. Each storage pool may include one or more storage disks. For example, storage pool 0 may include a disk 00, a disk 01, . . . , a disk 0M0, wherein M0 may be 0 (i.e., storage pool only includes one storage disk) or may be an integer equal to or larger than 1. Different storage pools may include different numbers of storage disks. For example, the number of storage disks contained in storage pool 1 (M1+1) may be different from the number of storage disks contained in storage pool 2 (M2+1). Herein, storage disks are typically RAID-based logical volumes provided to the storage system on storage devices at a lower level.

Various storage disks in different storage pools may have different nominal capacities. For example, the nominal capacity of disk 00 in storage pool 0 may be 100 GB, while disk 01 may have a nominal capacity of 150 GB. Before reallocating storage resources, the sum of the nominal capacity of each storage disk in a storage pool is referred to as original storage pool capacity Original_Pool_Capacity of the storage pool.

Storage system 4000 may further include unused storage disks U0 to Uk which have not been allocated to any storage pools. Note that storage system 4000 shown in FIG. 4 is merely one example of mass storage systems applicable to the techniques disclosed herein. Other storage systems having different arrangements from that of storage system 4000 may be utilized in practice.

Figure 5:
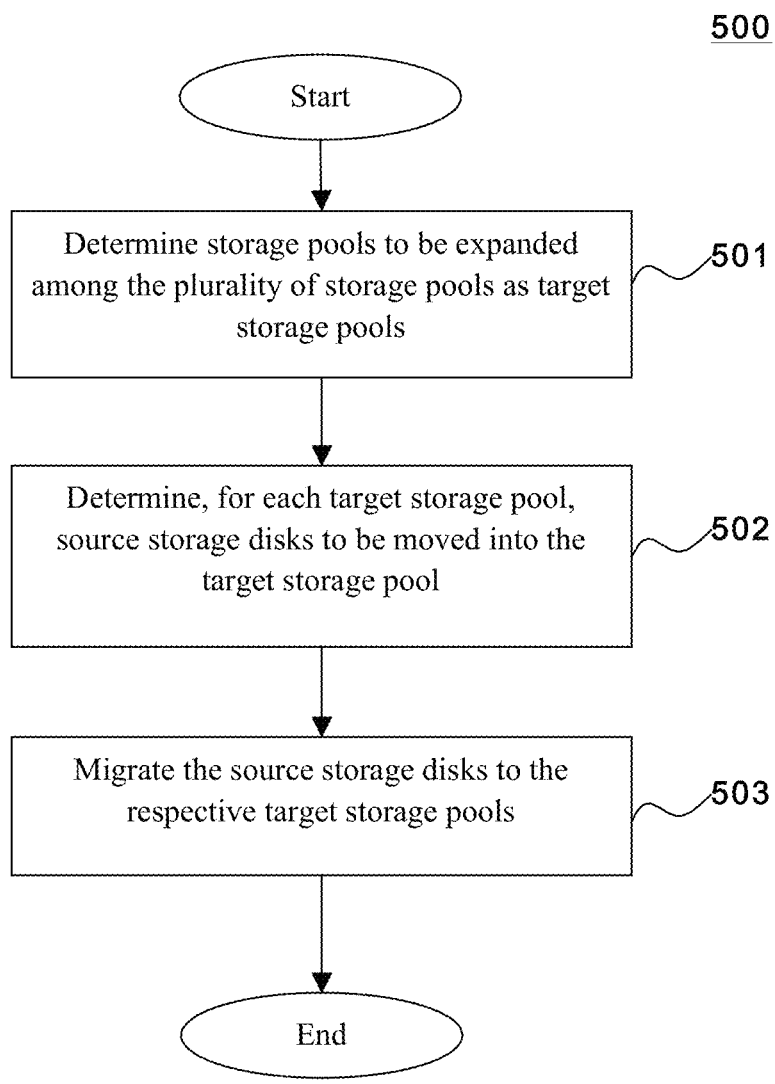
FIG. 5 is a flowchart of an example method for dynamically reconfiguring a storage system.

FIG. 5 shows an example method 500 for dynamically configuring a storage system. What is first determined is which storage pools need to be expanded among multiple storage pools (for example, storage pools 0 to N shown in FIG. 4) of the storage system (for example, storage system 4000 shown in FIG. 4) (step 501). For the convenience of description, a storage pool triggering capacity expansion in a storage system is referred to herein as a target storage pool while a storage pool from which some storage disks are moved out to a target storage pool is referred to herein as a source storage pool, and a storage disk that is moved to a target storage pool is referred to herein as a source storage disk.

Figure 6:
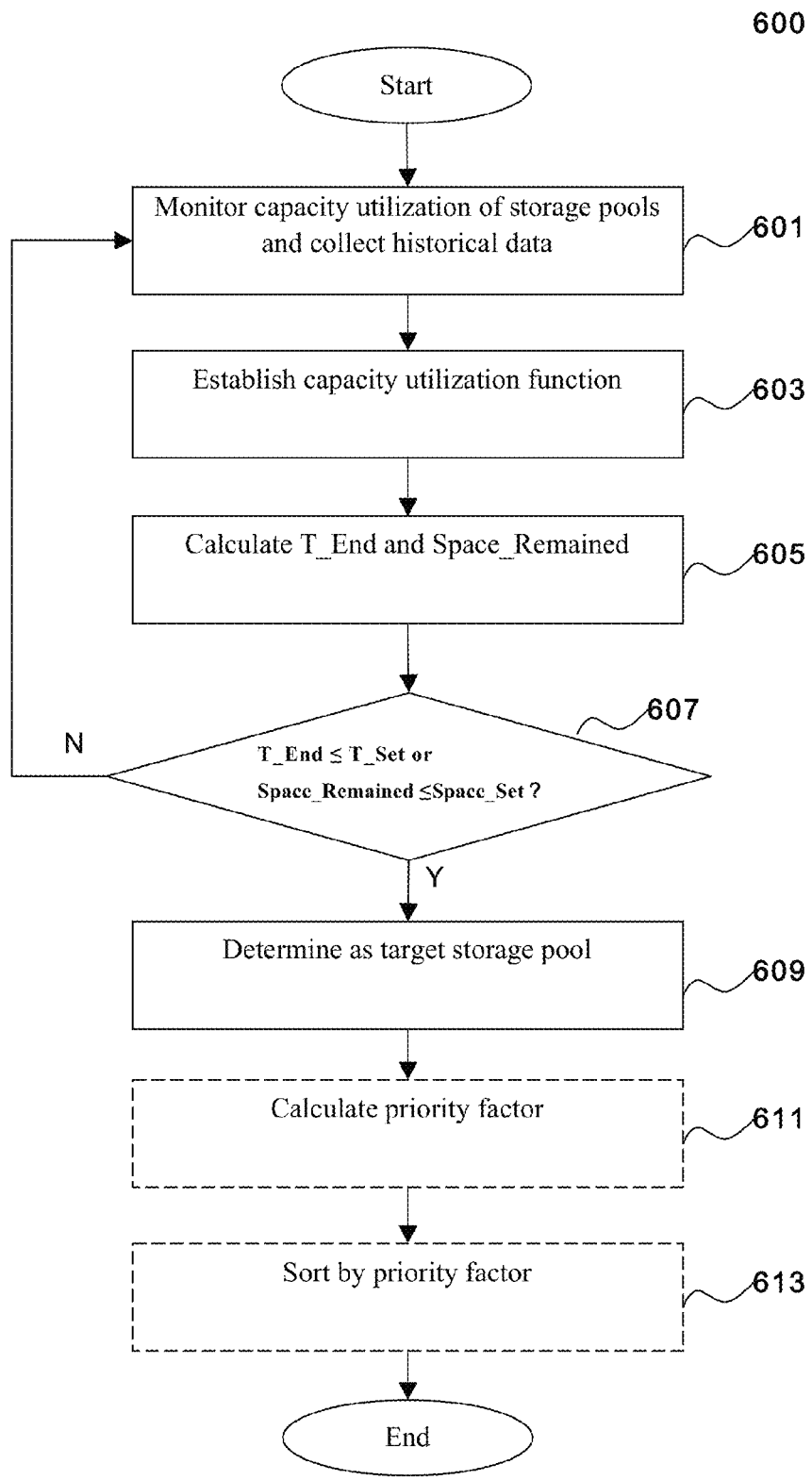
FIG. 6 is a flowchart of an example method illustrating a target storage pool determination process.

FIG. 6 shows an example process 600 of a specific implementation of step 501, where a trend prediction of storage resource utilization is employed for the accurate reallocation of storage resources. At step 601, capacity utilization (e.g., used capacity Space_Used) of each storage pool in storage system 4000 is monitored (for example, periodically or in real time), and is recorded in a history data table of the respective storage pool. For each storage pool, based on the collected history data, a function of used capacity with time, i.e., a capacity utilization function is established (step 603). As one example, a library of trend prediction models can be established in advance, which may include multiple trend prediction models, such as linear function models, power function models, logarithmic function models, polynomial function models, and so on. According to the collected history data, a trend prediction model optimally fitting the history data is then selected from the library of trend prediction models. A capacity utilization function Capacity_Used (t) is established for the storage pool using the trend prediction model selected for the respective storage pool and the collected history data.

Next, at step 605, a time until the exhaustion of the original storage pool capacity from a current point of time, i.e., a capacity exhaustion time T_End is calculated using the function Capacity_Used (t). Furthermore, a remaining capacity Space_Remained of the storage pool is calculated using the capacity utilization of the storage pool obtained at step 601. For example, a remaining capacity Space_Remained can be calculated by subtracting a used capacity from the original storage pool capacity of the storage pool.

Next, at step 607, capacity exhaustion time T_End is compared with a preset capacity exhaustion time threshold T_Set predetermined for the storage pool, while remaining capacity Space_Remained is compared with a preset remained-capacity threshold Space_Set predetermined for the storage pool. If the result of the comparison at step 607 shows T_End≤T_Set or Space_Remained≤Space_Set, the storage pool is determined as a target storage pool, indicating that the storage pool triggers a capacity expansion operation (step 609).

The preset capacity exhaustion time threshold and the preset remained-capacity threshold can be set in advance by users as needed. For different storage pools, it is also possible to set different preset capacity exhaustion time thresholds and different preset remained-capacity thresholds. For example, as to a storage pool, the preset capacity exhaustion time threshold can be set to 7 days, and the preset remained-capacity threshold can be set to 1 TB. In other words, a capacity expansion operation will be triggered when the storage pool would have its capacity used up within 7 days, or has a remaining capacity of less than 1 TB. It is noted that although the condition of triggering a capacity expansion operation have been described in terms of both of capacity exhaustion time and remaining capacity in the example of FIG. 6, whether a certain storage pool is a target storage pool can be determined based on comparison between any one of capacity exhaustion time and remaining capacity and a corresponding threshold.

Steps 601 to 609 are executed for all storage pools in storage system 4000, so that a list identifying all target storage pools requiring capacity expansion is determined, i.e., a list of target storage pools. Process 600 may further include a step of sorting the list of target storage pools according to their priorities. First, a priority factor p_factor of a target storage pool is calculated (step 611). According to the following equation (1), the capacity exhaustion time and the remained-capacity of the storage pool are normalized with the preset capacity exhaustion time threshold and the preset remained-capacity threshold:

$$std(T\_End) = T\_End / T\_Set$$

$$std(Space\_Remained) = Space\_Remained / Space\_Set \quad (1)$$

A priority factor p_factor of the target storage pool is calculated using the following equation (2):

$$p\_factor = \sqrt{std(T\_End)^2 + std(Space\_Remained)^2} \quad (2)$$
$$= \sqrt{(T\_End/T\_Set)^2 + (Space\_Remained/Space\_Set)^2}$$

It is noted that the smaller the priority factor p_factor is, the more urgent capacity expansion the storage pool requires. Therefore, a target storage pool can be inserted at an appropriate location in the list of target storage pools according to its priority factor p_factor (step 613). An example of a list of target storage pools is shown in Table 1 below.

TABLE 1

Example of a list of target storage pools sorted by priority factors

| Priority | Storage pool | T_End (day) | T_Set (day) | Space_Remained (GB) | Space_Set (GB) | p_factor |
|---|---|---|---|---|---|---|
| 1 | Pool 5 | 3 | 7 | 487 | 500 | 1.06 |
| 2 | Pool 8 | 5 | 7 | 513 | 500 | 1.25 |
| 3 | pool 2 | 2 | 5 | 160 | 100 | 1.33 |
| 4 | pool 1 | 3 | 6 | 73 | 50 | 1.54 |
| 5 | pool 3 | 10 | 7 | 558 | 600 | 1.70 |
| 6 | pool 0 | 7 | 7 | 620 | 400 | 1.84 |

It is noted that although the example above has been presented in relation to determining the execution order of capacity expansion of target storage pools in term of priory factors calculated based on equations (1) and (2), the execution order also can be determined in other manners. For example, instead of capacity exhaustion time and remaining capacity, the priory factor can be calculated based on the importance of data stored in the storage pool. As another example, when calculating the priory factor based on capacity exhaustion time and remaining capacity, capacity exhaustion time and remaining capacity can be normalized in other manners.

Figure 7:
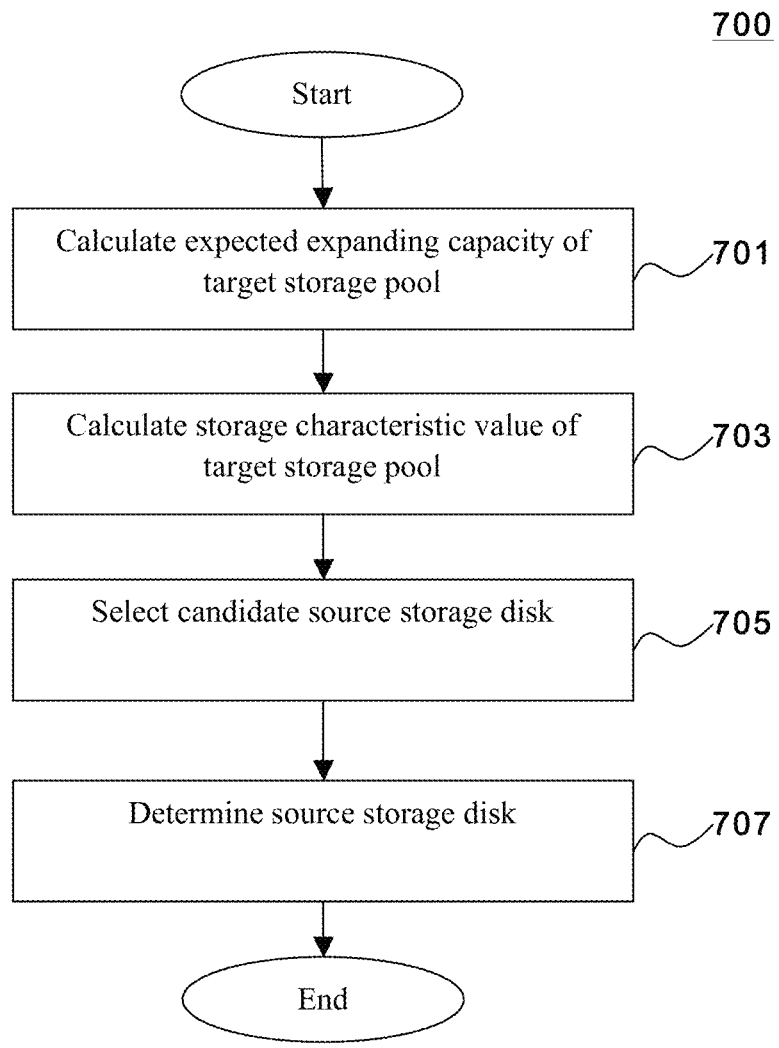
FIG. 7 is a flowchart of an example method illustrating a source storage disk determination process.
Figure 8:
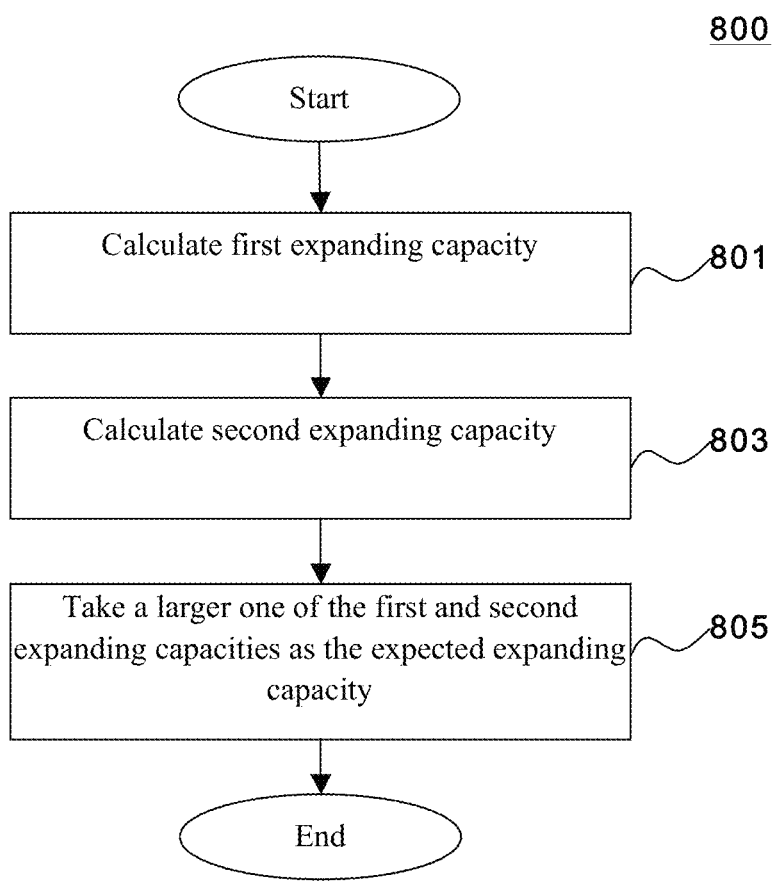
FIG. 8 is a flowchart of an example method illustrating a process of calculating an expected expanding capacity of a target storage pool.

Referring back to FIG. 5, after determining all target storage pools to be expanded in capacity at step 501, method 500 proceeds to step 502, in which for each of the determined storage pools, a storage resource mobility policy is developed for the target storage pool. That is, what is achieved is calculating how much capacity the target storage pool needs to be expanded, and determining which storage disk or disks in the storage system should be moved to the target storage pool. FIG. 7 shows an example source storage disk determination process 700. Source storage disk determination process 700 begins from the calculation of an expected expanding-capacity of a target storage pool (step 701). FIG. 8 shows an example method of a specific implementation 800 of step 701, in which an expected expanding-capacity of a target storage pool is determined based on both of the capacity exhaustion time and the remaining capacity of the target storage pool.

In one implementation, a preset post-expansion capacity exhaustion time threshold T_threshold and a preset post-expansion remaining capacity threshold Space_threshold of a target storage pool are set in advance by users. Preset threshold of post-expansion capacity exhaustion time threshold T_threshold represents the shortest period of time a target storage pool can be used after its capacity expansion, and preset post-expansion remaining capacity threshold Space_threshold represents the lowest available capacity of the target storage pool after capacity expansion. The two conditions in following equation (3) should thus be satisfied simultaneously after capacity expansion:

$$T\_end \geq T\_threshold$$

$$Space\_Remained \geq Space\_threshold \quad (3)$$

As one example, T_threshold and Space_threshold can be set to 2 times of T_Set and Space_Set respectively, for example, T_threshold can be set to 14 days and Space_threshold can be set to 2 TB.

Figure 9A:
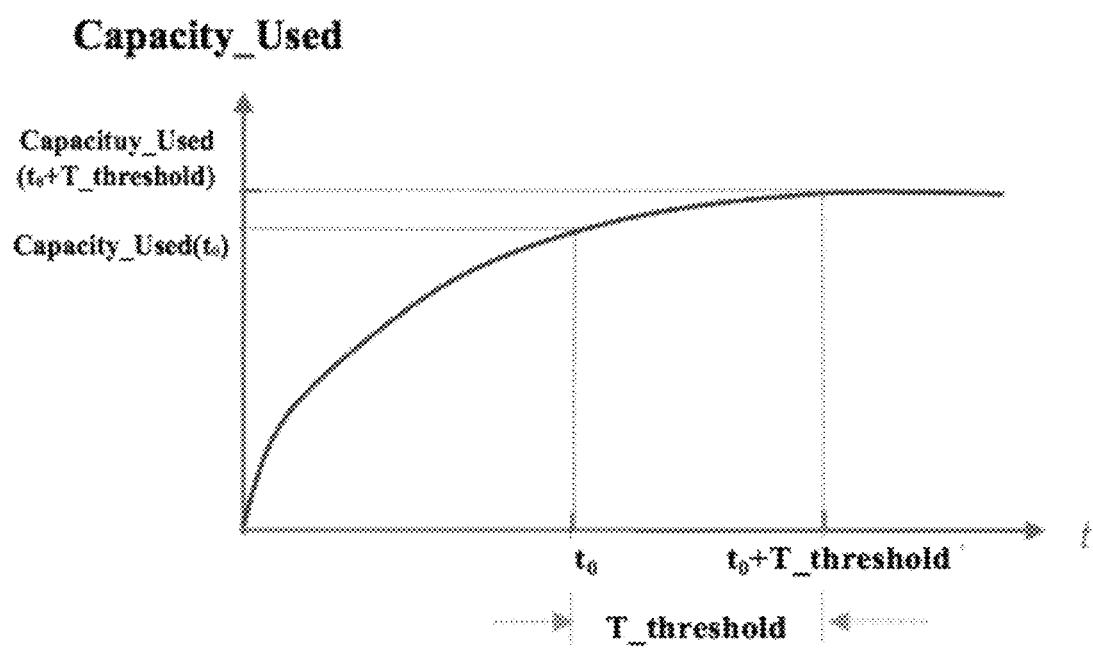
FIGS. 9A and 9B are of an example of an expected expanding capacity calculated based on a preset post-expansion capacity exhaustion time threshold.
Figure 9B:
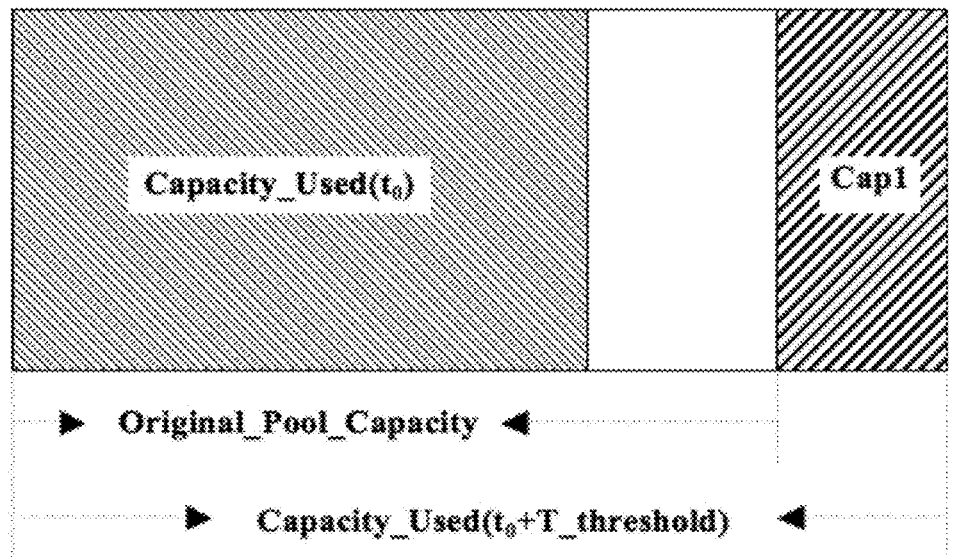
Figure 9C:
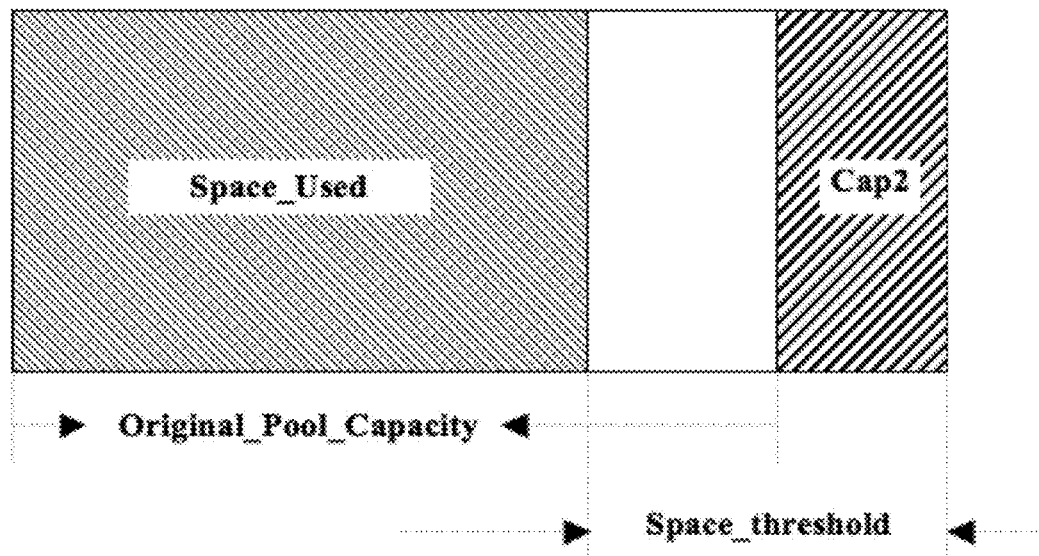
FIG. 9C is a diagram of an example of expected expanding capacity calculated based on a preset post-expansion remaining capacity threshold.

At step 801, a first expanding-capacity Cap1 is calculated based on the capacity exhaustion time of a target storage pool. In one implementation, the capacity utilization function Capacity_used (t) established at step 603 can be used to calculate a total capacity Capacity_T_Expanded of the target storage pool when the capacity exhaustion time T_end is equal to the preset post-expansion capacity exhaustion time threshold T_threshold. That is, as shown in FIG. 9A, the expected total capacity of a target storage pool after expansion capacity_T_Expanded=Capacity_Used (t0+T_threshold), wherein t0 represents a current time. As shown in the following equation (4) and in FIG. 9B, the first expanding-capacity Cap1 is calculated through subtracting the original storage pool capacity of the target storage device from the expected total capacity after expansion capacity_T_Expanded:

$$Cap1 = Capacity\_T\_Expanded - Original\_Pool\_Capacity \quad (4)$$

Next, at step 803, a second expanding-capacity Cap2 of the target storage pool is calculated based on the remaining capacity of the target storage pool. In one implementation, an expected total capacity after expansion of the target storage device Capacity_Space_Expanded is determined through adding the preset post-expansion remaining capacity threshold Space_threshold to the used capacity Space_used. As shown in the following equation (5) and in FIG. 9C, a second expanding-capacity Cap2 is calculated through subtracting the original storage pool capacity Original_Pool_Capacity of the target storage device from the expected total capacity after expansion Capacity_Space_Expanded:

$$Cap2 = Capacity\_Space\_Expanded - Original\_Pool\_Capacity \quad (5)$$

Finally, at step 805, a larger one of the first expanding-capacity Cap 1 and the second expanding-capacity Cap 2 is taken as the expected expanding-capacity of the target storage pool Claimed_Space=Max(Cap1, Cap2). After determining the expected expanding-capacity of a target storage pool shown in the process 800 in FIG. 8, the flow returns to FIG. 7 to proceed with determining which storage disk or disks satisfy the expected expanding-capacity and are suitable for migrating to the target storage pool. As shown in FIG. 7, in order to protect the performance and reliability of a target storage pool from obvious variation due to migration of source storage disks, a characteristic-match degree of the target storage pool and a source storage disk will be considered in the selection of the source storage disk.

Particularly, at step 703, a storage characteristic value MD(target_pool) of a target storage pool is calculated. The storage characteristic value of a target storage pool is defined as a weighted sum of storage characteristic values $MU(M_k)$ of all storage disks contained in the target storage pool, i.e., $$\sum_k d_k \times MU(M_k),$$

wherein, $d_k$ is the storage characteristic weight of the respective storage disk in the storage pool, which is relevant to the storage characteristic value $MU(M_k)$ of the storage disk and its performance in the storage pool, and $$\sum_k d_k = 1.$$

The storage characteristic value of each storage disk is based on, for example, any one or more of the RAID class of the storage disk, RAID size, Storage Area Network (SAN) redundancy, driving type, interface, Revolution(s) Per Minute (RPM), and cache size.

In one implementation, storage characteristic values are calculated for all storage disks in storage 4000. Then, the storage characteristic value of a target storage pool MD (target_pool) is calculated as described above based in the storage characteristic values of storage disks contained in the target storage pool. Thereafter, storage disks of storage system 4000 having storage characteristic values matched with the storage characteristic value of the target storage pool are selected as candidate source storage disks (step 705).

Figure 10:
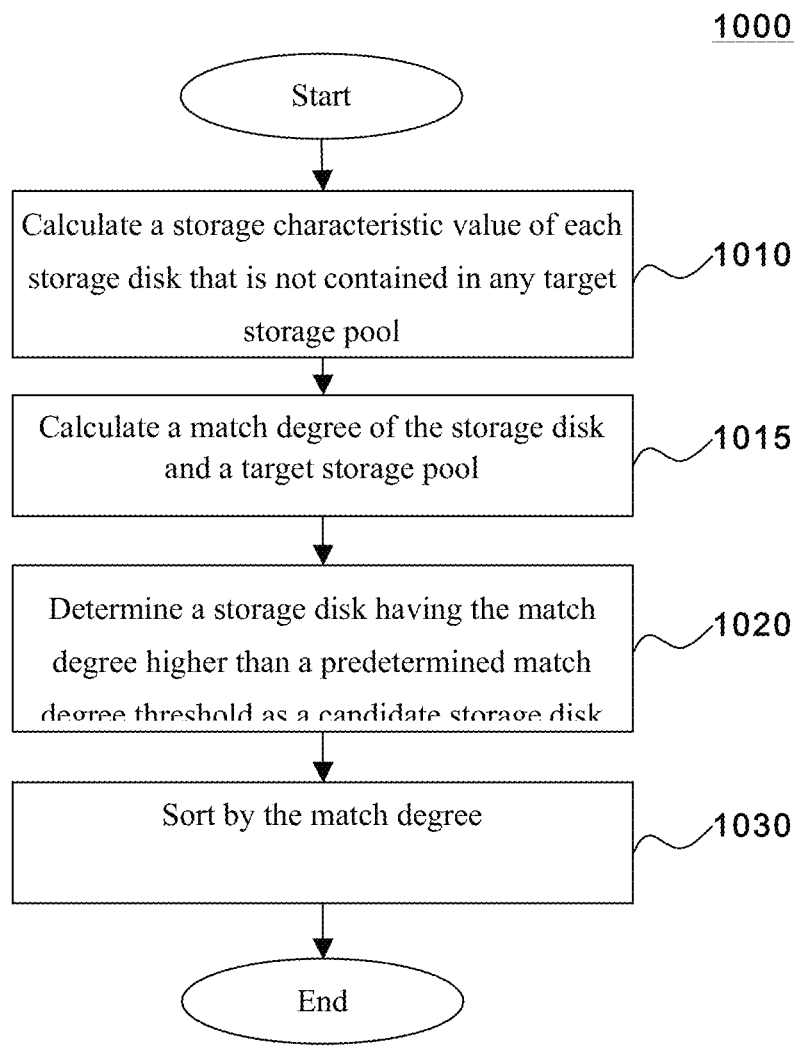
FIG. 10 is a flowchart of an example method illustrating a process of establishing a list of candidate source storage disks.

FIG. 10 shows an example process 1000 for establishing a list of candidate source storage disks. Process 1000 begins at step 1010, in which the storage characteristic value of each storage disk that does not contained in any target storage pool in storage system 4000 is obtained, excluding storage disks contained in any target storage pool. Next, based on the obtained storage characteristic value, nominal capacity, and used capacity of each storage disk, and the storage characteristic value of a target storage pool, a match degree Match_Degree between a storage disk and the target storage pool is calculated (step 1015).

In one implementation, the match degree Match_Degree is defined as:

$$\text{Match\_Degree} = \sqrt[2]{d_{TC}\left(\frac{TC-CS}{CS}\right)^2 + d_{UC}\left(\frac{UC}{CS}\right)^2 + d_{UD}\left(\frac{UD}{MD}\right)^2} \quad (6)$$

In this equation, TC represents the nominal capacity of the storage disk, and CS represents the expected expanding capacity of the target storage pool Claimed_Space (per step 701 of FIG. 7 and step 805 of FIG. 8). UC represents a used capacity of the storage disk, and UD represents the absolute value of the characteristic difference between the storage disk and the target storage pool, i.e., the absolute value of (MD (target_pool)−MU($M_j$)). MD represents the storage characteristic value MD(target_pool) of the target storage pool, $d_{TC}$, $d_{UC}$ and $d_{UD}$ represent weights of respective items in the above equation, and $\Sigma d_{TC}+d_{UC}+d_{UD}=1$.

The first item of equation (6) is relevant to the nominal capacity of the storage disk, which refers to the degree of the storage disk to satisfy the expected expanding capacity of a target storage pool—i.e., whether to move one source storage disk or multiple source storage disks to meet the capacity expansion requirement of the target storage pool. The second item of equation (6) is relevant to the capacity that has been used in the storage disk, which determines the overhead of cleaning data stored on the storage disk before its migration to the target storage pool; the smaller value of this item, the better. The third item of equation (6) is relevant to the characteristic difference between the storage disk and the target storage pool, which determines an optimal match thereof in terms of performance, redundancy, and other natural characteristics. The values of $d_{TC}$, $d_{UC}$ and $d_{UD}$ can be adjusted by users as needed to set the relationship of the above three items.

It is noted that although equation (6) calculates a match degree with respect to three aspects of nominal capacity, used capacity, and character difference to a target storage pool of a storage disk, just one or two aspects can be considered in other implementations. For instance, any one or two of $d_{TC}$, $d_{UC}$ and $d_{UD}$ may be set to zero. Alternatively or additionally, other performance aspects of a storage disk and a target storage pool can be used.

Next, process 1000 proceeds to step 1020, in which storage disks having match degrees calculated according to equation (6) and meeting a predetermined condition are selected as candidate source storage disks. For example, the predetermined condition may be to have a match degree higher than a predetermined threshold. Finally, in the case of multiple candidate source storage disks, they are sorted in a list of candidate source storage disks (step 1030). Note that steps 1020 and 1030 are not performed in some implementations. Furthermore, in some implementations, all storage disks that are not contained in any target storage pool can be determined as candidate source storage disks. In some scenarios, there is only one candidate source storage disk, and no sorting operation is needed. After determining the list of candidate source storage disks, the flow returns to FIG. 7 and proceeds to step 707, in which source storage disks that will be ultimately migrated to the target storage pool are determined from the list of candidate source storage disks.

Figure 11:
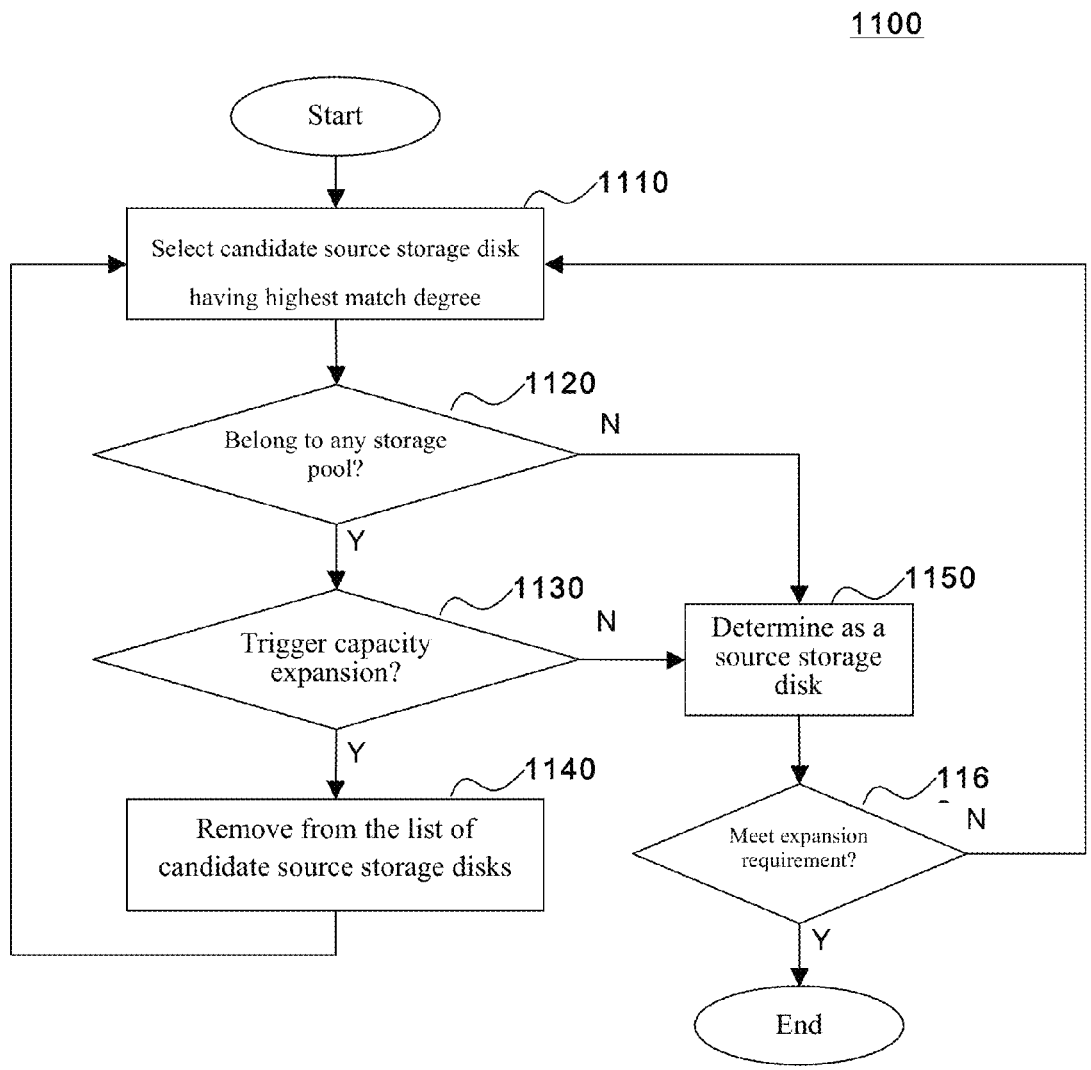
FIG. 11 is a flowchart of an example method illustrating a process of selecting a source storage disk.

FIG. 11 shows an example process 1100 of selecting source storage disks. At step 1110, a candidate source storage disk having the highest match degree is selected from the list of candidate source storage disks. Then, it is determined whether the candidate source storage disk belongs to any storage pool in storage system 4000 (step 1120). If it is determined that the candidate source storage disk does not belong to any storage pool, such as the case of any one of unused storage disks $U_0$ to $U_k$ as shown in FIG. 4, the candidate source storage disk is directly determined as a source storage disk to be migrated to the target storage pool, and is removed from the list of candidate source storage disks (step 1150).

If it is determined that the candidate source storage disk belongs to a certain storage pool, the flow proceeds to step 1130, in which it is determined whether migrating the candidate source storage disk from the source storage pool it belongs to may trigger a capacity expansion operation of the source storage pool. For example, this process can be achieved reference to process 600 of FIG. 6. In the case of determining that migrating the candidate source storage disk may lead to the need of capacity expansion for the source storage pool, this indicates that the candidate source storage disk in question is not suitable as a source storage disk, and thus is removed from the list of candidate source storage disks (step 1140). The flow returns to step 1110, steps 1120 to 1160 are carried out for a next candidate source storage disk having the highest match degree in the list of candidate source storage disks.

If it is determined at step 1130 that migrating the candidate source storage disk may not trigger capacity expansion operation of the source storage pool, the candidate source storage disk is set to be a source storage disk which will be moved to the target storage pool, and is removed from list of candidate source storage disks (step 1150). Next, at step 1160, it is determined whether the nominal capacity of the candidate source storage disk can meet the expected expanding capacity of the target storage pool (per step 701 of FIG. 7 and step 805 of FIG. 8). If it is determined that the candidate source storage disk can meet the expected expanding capacity of the target storage pool, source storage disk selection process 1100 ends. If it is determined at step 1160 that moving the candidate source storage disk in can not yet meet the expected expanding capacity of the target storage pool, the flow returns to step 1110 to continue with the selection of other suitable source storage disks so that the expected expanding capacity of the target storage pool can be met. In other words, there is possibly more than one source storage disk determined for a target storage pool.

Below, processes 1000 and 1100 of FIG. 10 and FIG. 11 are described in detail with reference to the following example. Assume that there are totally 11 storage disks MDisk0 to MDisk10 in a storage system, as shown in Table 2, in which 9 storage disks MDisk0 to MDisk8 are allocated to 5 storage pools Pool0 to Pool4 respectively, and storage disks MDisk9 and MDisk10 are unused. The nominal capacity of each storage disk is listed in the third column of Table 2.

TABLE 2

Property and storage characteristic values of storage disks

| Storage disk | Storage pool it belongs to | Nominal capacity (GB) | Storage characteristic value MU |
|---|---|---|---|
| MDisk0 | Pool0 | 100 | 100 |
| MDisk1 | Pool1 | 150 | 95 |
| MDisk2 | Pool1 | 150 | 85 |
| MDisk3 | Pool2 | 200 | 90 |
| MDisk4 | Pool2 | 100 | 100 |
| MDisk5 | Pool3 | 200 | 70 |
| MDisk6 | Pool4 | 200 | 50 |
| MDisk7 | Pool4 | 200 | 60 |
| MDisk8 | Pool4 | 200 | 90 |
| MDisk9 | Unused | 150 | 70 |
| MDisk10 | Unused | 300 | 85 |

Per step 1010 of FIG. 10, a storage characteristic value MU of each storage disk can be calculated based on the RAID class, RAID size, SAN redundancy, driving type, interface, RPM, and cache size of the storage disk, as shown in the fourth column of Table 2.

Assume further that capacity expansion has been triggered by Pool0, Pool1, and Pool4 (per FIG. 6). According to equation (2) a priority factor p_factor is calculated for each of target storage pools Pool0, Pool1, and Pool4, and then Pool0, Pool1, and Pool4 are sorted by the priority factors (see step 613 of FIG. 6). As shown in Table 3, suppose Pool1 is prior to Pool0, which, in turn, is prior to Pool4. Furthermore, per step 805 of FIG. 8 and step 703 of FIG. 7, an expected expanding capacity and a storage characteristic value are calculated for each of target storage pools Pool0, Pool1, and Pool4.

TABLE 27

Expected expanding capacity and storage characteristic values of target storage pools

| Priority | Target storage pool | Storage disks contained | Original storage pool capacity (GB) | Expected expanding capacity (GB) | Storage characteristic value MD |
|---|---|---|---|---|---|
| 1 | Pool1 | MDisk1 MDisk2 | 300 | 100 | 90 |
| 2 | Pool0 | MDisk0 | 100 | 50 | 100 |
| 3 | Pool4 | MDisk6 MDisk7 MDisk8 | 600 | 200 | 70 |

Capacity expansion is carried out according to the order indicated by the priority factors. A description is provided using Pool1 as an example. Since Pool0 and Pool4 also wait for capacity expansion, storage disks MDisk0, MDisk6 to MDisk8 contained therein are excluded from serving as candidate source storage disks of Pool1. Match degrees between storage disks MDisk3 to MDisk5 of Pool2, MDisk9 and MDisk10 that are unused in the storage system, and target storage pool Pool1 are calculated through equation (6) (per step 705 of FIG. 7 and step 1015 of FIG. 10), as shown in Table 4.

TABLE 4

List of candidate source storage disks sorted by match degree

| Storage disk | Target storage pool | Source storage pool | Nominal capacity (GB) | Used capacity (GB) | Characteristic deference with target storage pool | Match degree |
|---|---|---|---|---|---|---|
| MDisk4 | Pool1 | Pool2 | 100 | 10 | 10 | 0.115 |
| MDisk9 | Pool1 | Unused | 150 | 0 | 20 | 0.387 |
| MDisk3 | Pool1 | Pool2 | 200 | 50 | 0 | 0.652 |
| MDisk5 | Pool1 | Pool2 | 200 | 50 | 20 | 0.689 |
| MDisk10 | Pool1 | Unused | 300 | 0 | 5 | 1.266 |

Next, source storage disks that will be moved to target storage pool Pool1 are determined according to process 1100 shown in FIG. 11. First of all, a storage disk having the highest match degree is selected from the list of candidate source storage disks, in this example, MDisk4 of Pool2. If MDisk4 is not contained in any storage pool, it is directly moved to target storage pool Pool1. In this example, because MDisk4 has been allocated to Pool2, process 1100 goes to step 1130.

At step 1130, it is determined whether migrating MDisk4 from Pool2 may trigger capacity expansion through process 600 shown in FIG. 6. If it is determined that migrating MDisk4 from Pool2 may lead to capacity expansion of Pool2, MDisk4 is removed from the list of candidate source storage disks of Table 4, and a next storage disk having the highest match degree is selected, i.e., MDisk9 to analyze. In this example, it is assumed that migrating MDisk4 will not cause Pool2 to trigger capacity expansion. Then, it is determined whether the nominal capacity of MDisk4 can meet the expected expanding capacity of Pool1. As shown in Table 3, the expected expanding capacity of Pool1 is 100 GB, and the nominal capacity of MDisk4 is 100 GB as shown in Table 4. That is, MDisk4 can meet the expected expanding capacity of Pool1, and thus MDisk4 is determined as the source storage disk of Pool1.

According to the order indicated by the priority factor, process 1100 of FIG. 11 can be carried out for each target storage pool to determine a storage resource migration policy of the entire storage system 4000, including, for example, a migration table of a priority, target storage pools, source storage pools, and source storage disks. Thereafter, the flow returns to FIG. 5. Method 500 proceeds to step 503, in which the source storage disks will be migrated from source storage pools to respective target storage pools according to the priority indicated in the mitigation table, and the resource reallocation of whole storage system 4000 is finished.

Figure 12:
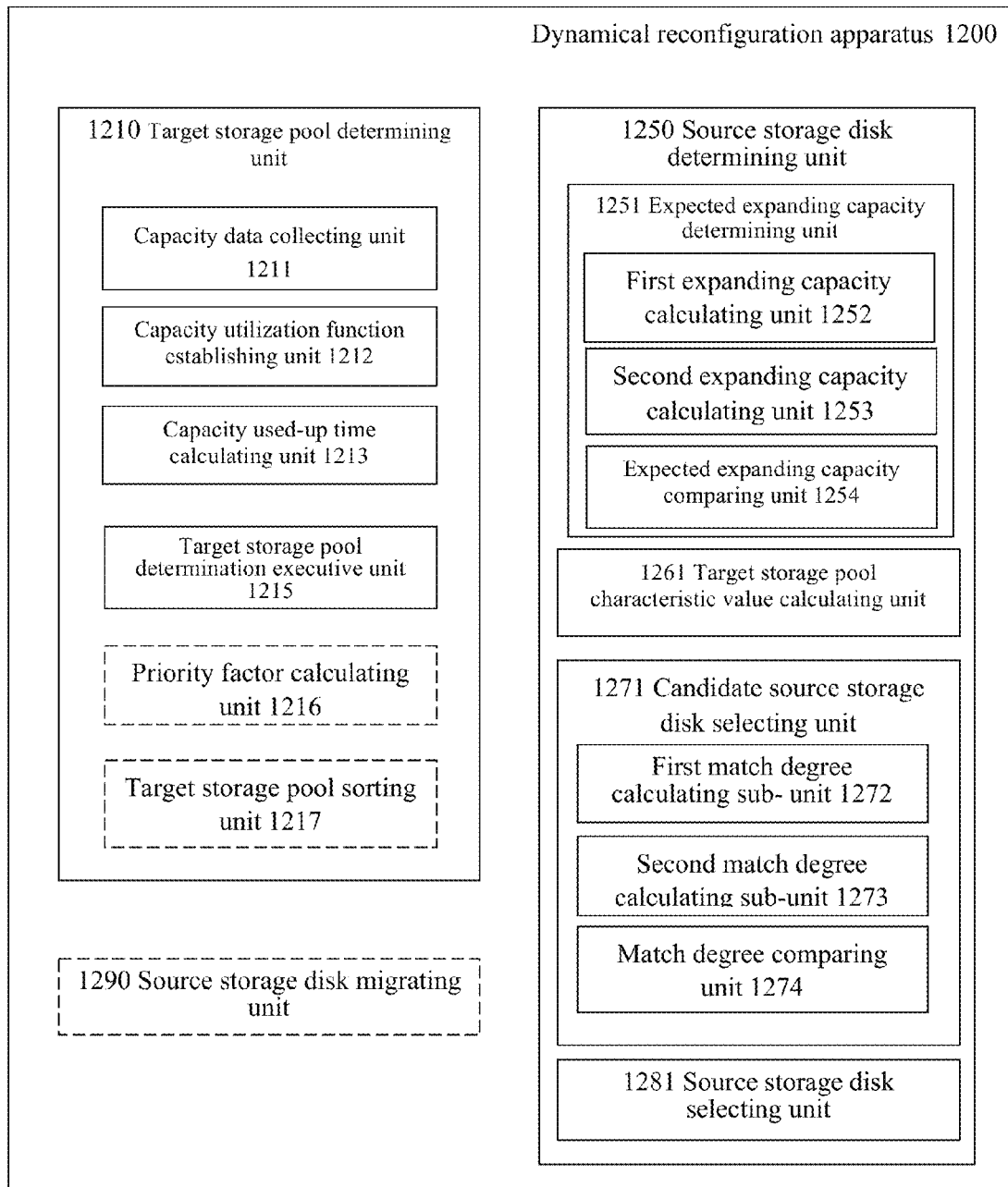
FIG. 12 is a functional block diagram of an example apparatus for dynamical reallocation.

FIG. 12 shows an example apparatus 1200 for dynamic reconfiguration. The function modules of apparatus 1200 for dynamical reconfiguration can be implemented in hardware, software, or a combination of hardware and software. Function modules shown in FIG. 12 may be combined or subdivided into sub-modules. Thus, the description herein supports any possible combination, sub-dividing, or further definition of function modules described herein.

Apparatus 1200 for dynamical reconfiguration can dynamically reconfigure storage resources in a storage system. The storage system may include multiple storage pools, each of which includes one or more storage disks. Apparatus 1200 for dynamic reconfiguration includes target storage pool determining unit 1210, source storage disk determining unit 1250, and source storage disk migrating unit 1290.

Target storage pool determining unit 1210 is configured to determine storage pools to be expanded among the storage pools as target storage pools. Source storage disk determining unit 1250 is configured to, for each target storage pool, determine source storage disks to be moved into the target storage pool. Source storage disk migrating unit 1290 is configured to migrate source storage disks to respective target storage pools.

In one implementation, target storage pool determining unit 1210 may include target storage pool determination executive unit 1215. As one example, if the capacity exhaustion time of a storage pool is less than a preset capacity exhaustion time threshold, it is determined as a target storage pool by target storage pool determination executive unit 1215. As another example, if the remaining capacity of a storage pool is less than a preset remained-capacity threshold, it is determined as a target storage pool by target storage pool determination executive unit 1215. As still another example, if the capacity exhaustion time of a storage pool is less than a preset capacity exhaustion time threshold, or its remaining capacity is less than a preset remained-capacity threshold, it is determined as a target storage pool by target storage pool determination executive unit 1215. Different storage pools may have different preset capacity exhaustion time thresholds and preset remained-capacity thresholds.

In one implementation, target storage pool determining unit 1210 may further include capacity data collecting unit 1211, capacity utilization function establishing unit 1212 and capacity exhaustion time calculating unit 1213. For each storage pool of the storage pools, capacity data collecting unit 1211 may collect historical capacity data. Based on the historical capacity data collected by capacity data collecting unit 1211, capacity utilization function establishing unit 1212 may establish a capacity utilization function. In one implementation, the capacity utilization function may be one of a linear function, a power function, a logarithmic function and a polynomial function. Using the capacity utilization function established by capacity utilization function establishing unit 1212, capacity exhaustion time calculating unit 1213 may calculate the capacity exhaustion time of the storage pool.

In one implementation, target storage pool determining unit 1210 may further include priority factor calculating unit 1216 and target storage pool sorting unit 1217. For each one of target storage pools, priority factor calculating unit 1216 may calculate its priority factor. In one implementation, the priority factor can be calculated as a sum of squares of a normalized capacity exhaustion time and a normalized remaining capacity. The normalized capacity exhaustion time is a ratio of a capacity exhaustion time to a preset capacity exhaustion time threshold, and the normalized remaining capacity is a ratio of a remaining capacity to a preset remained-capacity threshold. Target storage pool sorting unit 1217 may sort all target storage pools determined by target storage pool determination executive unit 1215 according to priority factors calculated by priority factor calculating unit 1216. The determination of source storage disks can be executed in an order determined according to priority factors calculated by priority factor calculating unit 1216.

In one implementation, source storage disk determining unit 1250 may include expected expanding capacity determining unit 1251, target storage pool characteristic value calculating unit 1261, candidate source storage disk selecting unit 1271, and source storage disk selecting unit 1281. Expected expanding capacity determining unit 1251 may calculate the expected expanding capacity of a target storage pool determined by target storage pool determining unit 1210. In one implementation, expected expanding capacity determining unit 1251 may include the following.

First expanding capacity calculating unit 1252 is configured to calculate a first expanding capacity of a target storage pool based on the capacity exhaustion time of the target storage pool. Second expanding capacity calculating unit 1253 is configured to calculate a second expanding capacity of the target storage pool based on the remaining capacity of the target storage pool. Expected expanding capacity comparing unit 1254 is configured to compare the first expanding capacity calculated by first expanding capacity calculating unit 1252 and the second expanding capacity calculated by second expanding capacity calculating unit 1253, and to determine the larger one of them as the expected expanding capacity of the target storage pool.

In one implementation, first expanding capacity calculating unit 1252 may further include the following. A first capacity calculating sub-unit is configured to set a preset post-expansion capacity exhaustion time threshold for a target storage pool. A second capacity calculating sub-unit is configured to determine the total capacity of the target storage pool when the capacity exhaustion time of the target storage pool is equal to the preset post-expansion capacity exhaustion time threshold of the target storage pool. A third capacity calculating sub-unit is configured to calculate the first expanding capacity of the target storage pool through subtracting the original storage pool capacity of the target storage pool from the determined total capacity.

In one implementation, second expanding capacity calculating unit 1253 may further include the following. A fourth capacity calculating sub-unit is configured to set a preset post-expansion remaining capacity threshold for a target storage pool. A fifth capacity calculating sub-unit is configured to calculate a sum of the preset post-expansion remaining capacity threshold and a used capacity as a total capacity of the target storage pool. A sixth capacity calculating sub-unit is configured to calculate the second expanding capacity of the target storage pool through subtracting the original storage pool capacity of the target storage pool from the determined total capacity.

Target storage pool characteristic value calculating unit 1261 may calculate a storage characteristic value for a target storage pool. In one implementation, target storage pool characteristic value calculating unit 1261 may further include the following. A first characteristic value calculating sub-unit is configured to calculate storage characteristic values of storage disks contained in a target storage pool. A second characteristic value calculating sub-unit is configured to determine storage characteristic weights of storage disks contained in the target storage pool. A third characteristic value calculating sub-unit is configured to calculate a sum of products of the storage characteristic values and the storage characteristic weights as a storage characteristic value of the target storage pool. In one implementation, the storage characteristic value of each storage disk is based on any one or more of the RAID class, RAID size, Storage Area Network (SAN) redundancy, driving type, interface, revolutions per minute (RPM), and cache size of the storage disk.

Candidate source storage disk selecting unit 1271 may select storage disks of the storage system having characteristic values matched with that of a target storage pool, and add them to a list of candidate source storage disks. In one implementation, candidate source storage disk selecting unit 1271 includes the following. First match degree calculating sub-unit 1272 is configured to calculate storage characteristic values of storage disks that are not contained in any target storage pool. Second match degree calculating sub-unit 1273 is configured to calculate a match degree of a storage disk and a target storage pool based on the nominal capacity, used capacity and storage characteristic value of the storage disk, and the storage characteristic value of the target storage pool. Match degree comparing unit 1274 is configured to select storage disks having match degrees calculated by second match degree calculating sub-unit 1273 meeting a predetermined condition as candidate source storage disks. In one implementation, the predetermined condition may require a match degree higher than a predetermined threshold.

Source storage disk selecting unit 1281 may determine source storage disks to be moved into a target storage pool from a list of candidate source storage disks based on the expected expanding capacity calculated by expected expanding capacity determining unit 1251. In one implementation, source storage disk selecting unit 1281 may include the following. A first source storage disk determining sub-unit is configured to select a candidate source storage disk having the highest match degree from the list of candidate source storage disks. A second source storage disk determining sub-unit is configured to determine whether the candidate source storage disk having the highest match degree belongs to any storage pool. A third source storage disk determining sub-unit is configured to, if it is determined that the candidate source storage disk having the highest match degree does not belong to any storage pool, select the candidate source storage disk having the highest match degree as a source storage disk to be moved into a target storage pool, and to remove the candidate source storage disk having the highest match degree from the list of candidate source storage disks.

A fourth source storage disk determining sub-unit is configured to, if it is determined that the candidate source storage disk having the highest match degree belongs to a storage pool, execute the following operations. One operation is determining whether moving out the candidate source storage disk having the highest match degree will trigger capacity expansion of the storage pool it belongs to. A second operation is, if it is determined that moving out the candidate source storage disk having the highest match degree will trigger capacity expansion of the storage pool it belongs to, removing the candidate source storage disk having the highest match degree from the list of candidate source storage disks. A third operation is, if it is determined that moving out the candidate source storage disk having the highest match degree will not trigger capacity expansion of the storage pool it belongs to, selecting the candidate source storage disk having the highest match degree as a source storage disk to be moved into the target storage pool. A fourth operation is removing this disk from the list of candidate source storage disks. A fifth source storage disk determining sub-unit is configured to determine whether the determined source storage disk meets the calculated expected expanding capacity of the target storage pool.

With the techniques disclosed herein, capacity expansion demand of storage pools in a storage system can be predicted, and storage resources in the storage system can be automatically and accurately reallocated. With these techniques, it is also possible to take the growth trends of capacity utilization of a target storage pool and a source storage pool into account to allocate storage resources more reasonably. The techniques also make it possible to take effects on the performance of a target storage pool and a source storage pool into account to allocate storage resources more reasonably. Likewise, with the techniques disclosed herein, it is possible to take the effect on SLV (Service level Agreement) of each of target and source storage pools into account to allocate storage resources more reasonably.

It noted that although the aforementioned description described techniques in relation to cloud computing, these techniques can be applied to environments other than a cloud computing environment. It is also noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method for dynamically reconfiguring a storage system, the storage system including a plurality of storage pools, each of the storage pools including one or more storage disks, wherein the method comprises:
   determining, among the plurality of storage pools, storage pools to be expanded as target storage pools;
   determining, for the target storage pools, source storage disks to be moved into the target storage pools from other storage pools than the target storage pools in the storage system; and
   migrating the source storage disks to the respective target storage pools,
   wherein determining the storage pools to be expanded as the target storage pools further comprises:
       calculating a priority factor of each of the target storage pools;
       sorting the target storage pools according to the priority factors, so that the operation of determining the source storage disks is executed in an order determined based on the priority factors,
   and wherein the priority factor is calculated as a sum of the square of a normalized capacity exhaustion time and the square of a normalized remaining capacity, wherein the normalized capacity exhaustion time is a ratio of a capacity exhaustion time to a preset capacity exhaustion time threshold, and the normalized remaining capacity is a ratio of a remaining capacity to a preset remaining capacity threshold.

2. The method according to claim 1, wherein determining the storage pools to be expanded as the target storage pools comprises:
if capacity exhaustion time of a storage pool is less than a preset capacity exhaustion time threshold, determining the storage pool as a target storage pool.

3. The method according to claim 1, wherein determining the storage pools to be expanded as the target storage pools comprises:
if remaining capacity of a storage pool is less than a preset remaining capacity threshold, determining the storage pool as a target storage pool.

4. The method according to claim 1, wherein determining source storage disks to be moved into the respective target storage pools comprises:
calculating an expected expanding capacity of a target storage pool;
calculating a storage characteristic value of the target storage pool;
selecting storage disk(s) of the storage system having storage characteristic value(s) matching that of the target storage pool to add the storage disk(s) to a list of candidate source storage disks; and
determining, based on the calculated expected expanding capacity, source storage disk(s) to be moved into the target storage pool from the list of candidate source storage disks.

5. The method according to claim 4, wherein calculating an expected expanding capacity of a target storage pool comprises:
calculating, based on the capacity exhaustion time of the target storage pool, a first expanding capacity of the target storage pool;
calculating, based on the remaining capacity of the target storage pool, a second expanding capacity of the target storage pool; and
comparing the first expanding capacity and the second expanding capacity, and selecting a larger one of them as the expected expanding capacity of the target storage pool.

6. The method according to claim 5, wherein calculating a first expanding capacity of the target storage pool comprises:
setting a preset post-expansion capacity exhaustion time threshold for the target storage pool;
determining a total capacity of the target storage pool when the capacity exhaustion time of the target storage pool is equal to the preset post-expansion capacity exhaustion time threshold; and
calculating the first expanding capacity of the target storage pool through subtracting an original storage pool capacity of the target storage pool from the determined total capacity.

7. The method according to claim 5, wherein calculating a second expanding capacity of the target storage pool comprises:
setting a preset post-expansion remaining capacity threshold for the target storage pool;
calculating a sum of the preset post-expansion remaining capacity threshold and a used capacity as a total capacity of the target storage pool; and
calculating the second expanding capacity of the target storage pool through subtracting an original storage pool capacity of the target storage pool from the determined total capacity.

8. The method according to claim 4, wherein calculating a storage characteristic value of the target storage pool comprises:
calculating storage characteristic values of storage disks contained in the target storage pool;
determining storage characteristic weights of the storage disks contained in the target storage pool; and
calculating a sum of products of the storage characteristic values and the storage characteristic weights as the storage characteristic value of the target storage pool.

9. The method according to claim 4, wherein selecting storage disk(s) of the storage system having storage characteristic value(s) matching that of the target storage pool to add storage disk(s) to a list of candidate source storage disks comprises:
calculating storage characteristic values of storage disks in the storage system that are not contained in any target storage pools;
calculating a match degree of a respective storage disk and the target storage pool based on a nominal capacity, the used capacity and the storage characteristic value of the storage disk, and the storage characteristic value of the target storage pool; and
selecting storage disk(s) having match degree(s) meeting a predetermined condition as the candidate source storage disk(s).

10. The method according to claim 9, wherein determining source storage disk(s) to be moved into the target storage pool from the list of candidate source storage disks comprises:
a) selecting a candidate source storage disk having a highest match degree from the list of candidate source storage disks;
b) determining whether the candidate source storage disk having the highest match degree belongs to any storage pool;
c) if it is determined that the candidate source storage disk having the highest match degree does not belong to any storage pool, selecting the candidate source storage disk having the highest match degree as a source storage disk to be moved into the target storage pool, and removing the candidate source storage disk having the highest match degree from the list of candidate source storage disks;
d) if it is determined that the candidate source storage disk having the highest match degree belongs to a storage pool:
determining whether moving out the candidate source storage disk having the highest match degree will trigger capacity expansion of the storage pool it belongs to;
if it is determined that moving out the candidate source storage disk having the highest match degree will trigger capacity expansion of the storage pool it belongs to, removing the candidate source storage disk having the highest match degree from the list of candidate source storage disks, and
if it is determined that moving out the candidate source storage disk having the highest match degree will not trigger capacity expansion of the storage pool it belongs to, selecting the candidate source storage disk having the highest match degree as a source storage disk to be moved into the target storage pool, and removing it from the list of candidate source storage disks;
e) determining whether the determined source storage disk meets the calculated expected expanding capacity of the target storage pool; and f) in the case of determining that the determined source storage disk does not meet the calculated expected expanding-capacity of the target storage pool, repeating above steps a) to f).

11. The method according to claim 2, wherein the capacity exhaustion time is calculated by:
   collecting historical capacity data of a storage pool;
   establishing, based on the collected historical capacity data, a capacity utilization function;
   calculating, by use of the established capacity utilization function, the capacity exhaustion time of the storage pool.

12. An apparatus for dynamically reconfiguring a storage system, the storage system comprising a plurality of storage pools, each storage pool including one or more storage disks, the apparatus comprising:
   a target storage pool determining unit, configured to determine, among the plurality of storage pools, storage pools to be expanded as target storage pools;
   a source storage disk determining unit, configured to, for the target storage pools determined by the target storage pool determining unit, determine source storage disks to be moved into the target storage pools from other storage pools than the target storage pools; and
   a source storage disk migrating unit, configured to migrate the source storage disks determined by the source storage disk determining unit to the respective target storage pools,
   wherein the target storage pool determining unit further comprises:
      a priority factor calculating unit, configured to calculate a priority factor for each of the target storage pools; and
      a target storage pool sorting unit, configured to sort the target storage pools according to the priority factors calculated by the priority factor calculating unit,
   wherein the source storage disk determining unit determines source storage disks to be moved into target storage pools in an order determined by the target storage pool sorting unit,
   wherein the priority factor is calculated as a sum of squares of a normalized capacity exhaustion time and a normalized remaining capacity, wherein the normalized capacity exhaustion time is a ratio of a capacity exhaustion time to a preset capacity exhaustion time threshold, and the normalized remaining capacity is a ratio of a remaining capacity to a preset remaining capacity threshold.

13. The apparatus according to claim 12, wherein the target storage pool determining unit comprises:
   a target storage pool determination executive unit, configured to, if a capacity exhaustion time of a storage pool is less than a preset capacity exhaustion time threshold, determine the storage pool as a target storage pool.

14. The apparatus according to claim 12, wherein the target storage pool determining unit comprises:
   a target storage pool determination executive unit, configured to, if a remaining capacity of a storage pool is less than a preset remaining capacity threshold, determine the storage pool as a target storage pool.

15. The apparatus according to claim 12, wherein the source storage disk determining unit comprises:
   an expected expanding capacity calculating unit, configured to calculate an expected expanding capacity of a target storage pool;
   a target storage pool characteristic value calculating unit, configured to calculate a storage characteristic value of the target storage pool;
   a candidate source storage disk selecting unit, configured to select storage disk(s) of the storage system having characteristic value(s) matching that of the target storage pool, and add the storage disk(s) to a list of candidate source storage disks; and
   a source storage disk selecting unit, configured to determine source storage disk(s) to be moved into the target storage pool from the list of candidate source storage disks based on the expected expanding capacity calculated by the expected expanding capacity calculating unit.

16. The apparatus according to claim 15,
   wherein the expected expanding capacity calculating unit comprises:
      a first expanding capacity calculating unit, configured to calculate a first expanding capacity of the target storage pool based on the capacity exhaustion time of the target storage pool;
      a second expanding capacity calculating unit, configured to calculate a second expanding capacity of the target storage pool based on the remaining capacity of the target storage pool; and
      an expected expanding capacity comparing unit, configured to compare the first expanding capacity calculated by the first expanding capacity calculating unit and the second expanding capacity calculated by the second expanding capacity calculating unit, and determine the larger one of them as the expected expanding capacity of the target storage pool,
   wherein the target storage pool characteristic value calculating unit comprises:
      a first characteristic value calculating sub-unit, configured to calculate storage characteristic values of storage disks contained in the target storage pool;
      a second characteristic value calculating sub-unit, configured to determine storage characteristic weights of the storage disks contained in the target storage pool; and
      a third characteristic value calculating sub-unit, configured to calculate a sum of products of the storage characteristic values and the storage characteristic weights as the storage characteristic value of the target storage pool,
   and wherein the candidate source storage disk selecting unit comprises:
      a first match degree calculating sub-unit, configured to calculate storage characteristic values of storage disks that are not contained in any target storage pools;
      a second match degree calculating sub-unit, configured to calculate a match degree of a respective storage disk and a target storage pool based on a nominal capacity, the used capacity and the storage characteristic value of the storage disk, and the storage characteristic value of the target storage pool; and
      a match degree comparing unit, configured to select storage disk(s) having match degree(s) calculated by the second match degree calculating sub-unit meeting a predetermined condition as the candidate source storage disk(s).

17. The apparatus according to claim 13, wherein the target storage pool determining unit further comprises:
   a capacity data collecting unit, configured to collect historical capacity data of a storage pool;

a capacity utilization function establishing unit, configured to, based on the historical capacity data collected by the capacity data collecting unit, establish a capacity utilization function;

a capacity exhaustion time calculating unit, configured to, by use of the capacity utilization function established by the capacity utilization function establishing unit, calculate the capacity exhaustion time of the storage pool.

18. A method for dynamically reconfiguring a storage system, the storage system including a plurality of storage pools, each of the storage pools including one or more storage disks, wherein the method comprises:

determining, among the plurality of storage pools, storage pools to be expanded as target storage pools;

determining, for the target storage pools, source storage disks to be moved into the target storage pools from other storage pools than the target storage pools in the storage system; and migrating the source storage disks to the respective target storage pools, wherein determining source storage disks to be moved into the respective target storage pools comprises:

calculating an expected expanding capacity of a target storage pool;

calculating a storage characteristic value of the target storage pool;

selecting storage disk(s) of the storage system having storage characteristic value(s) matching that of the target storage pool to add the storage disk(s) to a list of candidate source storage disks; and determining, based on the calculated expected expanding capacity, source storage disk(s) to be moved into the target storage pool from the list of candidate source storage disks, wherein calculating an expected expanding capacity of a target storage pool comprises:

calculating, based on the capacity exhaustion time of the target storage pool, a first expanding capacity of the target storage pool;

calculating, based on the remaining capacity of the target storage pool, a second expanding capacity of the target storage pool; and comparing the first expanding capacity and the second expanding capacity, and selecting a larger one of them as the expected expanding capacity of the target storage pool, and wherein calculating a first expanding capacity of the target storage pool comprises:

setting a preset post-expansion capacity exhaustion time threshold for the target storage pool;

determining a total capacity of the target storage pool when the capacity exhaustion time of the target storage pool is equal to the preset post-expansion capacity exhaustion time threshold; and calculating the first expanding capacity of the target storage pool through subtracting an original storage pool capacity of the target storage pool from the determined total capacity.

19. The method of claim 18, wherein calculating a second expanding capacity of the target storage pool comprises:

setting a preset post-expansion remaining capacity threshold for the target storage pool;

calculating a sum of the preset post-expansion remaining capacity threshold and a used capacity as a total capacity of the target storage pool; and calculating the second expanding capacity of the target storage pool through subtracting an original storage pool capacity of the target storage pool from the determined total capacity.

* * * * *